United States Patent [19]
Guo

[11] Patent Number: 5,156,864
[45] Date of Patent: Oct. 20, 1992

[54] PLASTICS THREADED FITTING MOLDING MECHANISM

[76] Inventor: Muh-Juh Guo, No. 7, Alley 53, Lane 274, An Ho Road, Tainan City, Taiwan

[21] Appl. No.: 651,151

[22] Filed: Feb. 6, 1991

[51] Int. Cl.⁵ .............................................. B29C 45/17
[52] U.S. Cl. .................................... 425/577; 425/383; 425/394
[58] Field of Search ............... 249/145; 425/542, 577, 425/383, 393, 398, 394; 264/310, 318, 334

[56] References Cited

U.S. PATENT DOCUMENTS

| | | | |
|---|---|---|---|
| Re. 31,404 | 10/1983 | Anger | 264/318 |
| 1,961,213 | 6/1934 | Guyot | 249/145 |
| 2,079,393 | 5/1937 | Benge | 264/334 |
| 4,589,623 | 5/1986 | Horch et al. | 249/145 |
| 4,848,718 | 7/1989 | Harrison | 425/577 |

Primary Examiner—Willard Hoag
Attorney, Agent, or Firm—Browdy and Neimark

[57] ABSTRACT

A plastics threaded fitting molding mechanism, which is aimed to resolve the conventional problem limited only to produce single direction threads, utilizes three pushing rods and corresponding co-axially disposed therein, performing reciprocating movement, to make the three ways plastics threaded fitting. Therefore, it is substantial to save time and labor while reducing manufacturing cost.

2 Claims, 7 Drawing Sheets

44-44' SEC.

43-43' SEC.

45-45' SEC.

PLASTICS THREADED FITTING MOLDING MECHANISM

BACKGROUND OF THE INVENTION

1. Field of the Invention

The present invention relates to a plastics threaded fitting molding mechanism.

2. The Prior Art

It has been proposed in molding apparatus using conventional molding technique to make plastics threaded fittings in a single direction; however, it is desireable to make a three-way plastics threaded fitting for fluid flow.

SUMMARY OF THE INVENTION

The invention utilizes a plastics threaded fitting molding mechanism comprising three pushing rods with threadeded head portions to form female threads and three shafts co-axially disposed therein, to resolve the conventional problem of single direction plastics threaded fittings, and makes three-way plastics fittings by extruding molten plastics into a space generally defined by said rods and said shafts.

In utilizing the invention, there is provided plastics threaded fittings of molding mechanism a reduced manufacturing cost.

DETAILED DESCRIPTION OF THE PREFERRED EMBODIMENT

Figure 1:
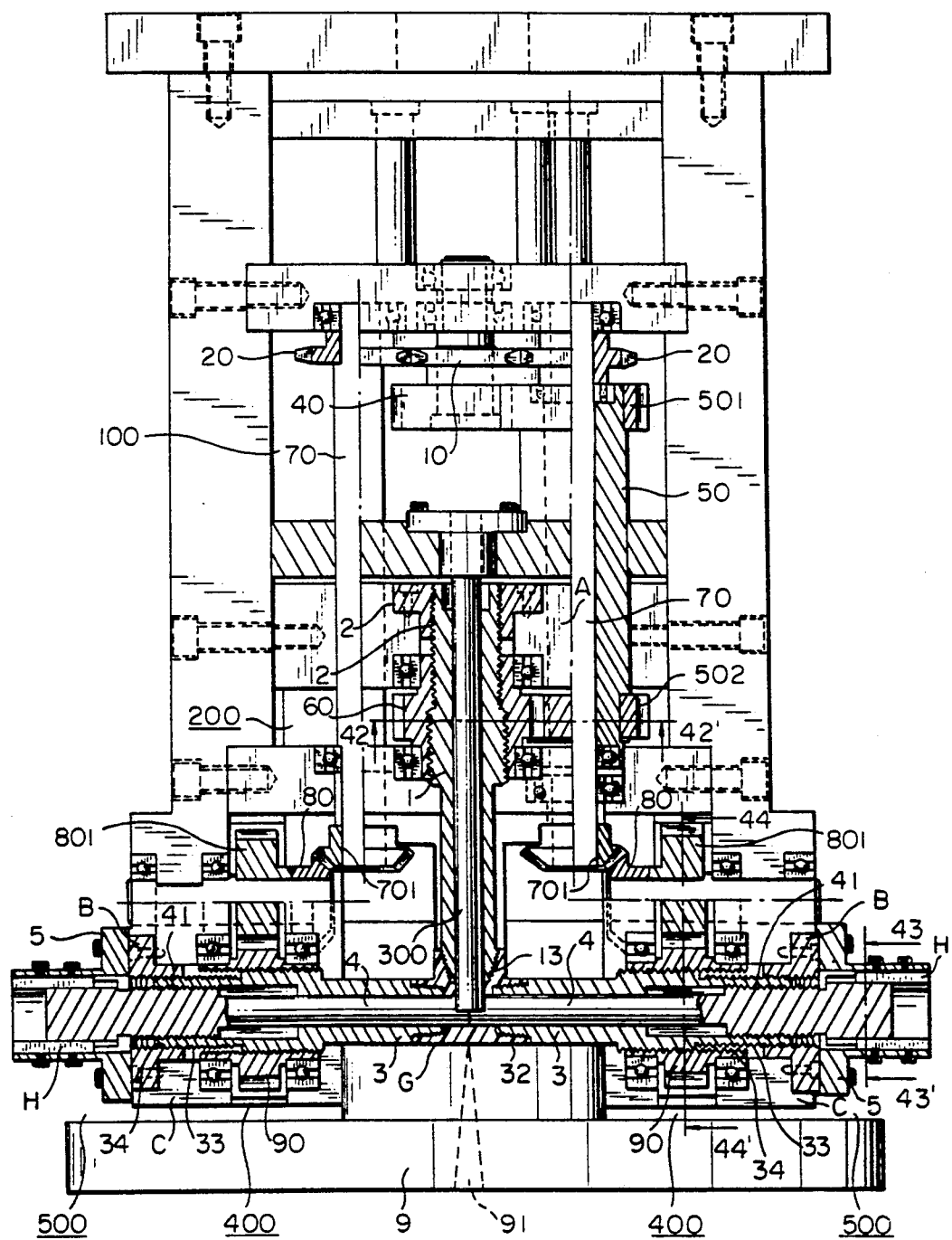
FIG. 1 is a frontal elevational view according to the present invention.

Referring to FIG. 1, a plastics threaded fitting molding mechnism generally comprises transmission 100, vertical pushing assembly 200, vertical shaft assembly 300, horizontal pushing rod assembly 400, and horizontal shaft assembly 500.

Figure 2:
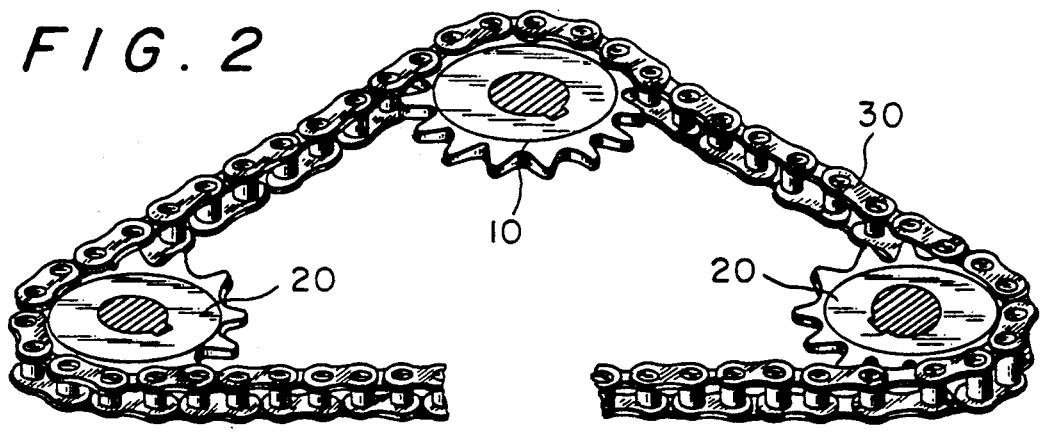
FIG. 2 shows the arrangement of three sprockets in transmission.

The transmission 100 drives sprocket 10 and a pair of driven sprockets 20, driven by a motor (not shown) via chain 30 as shown in FIG. 2, so that said sprockets rotate in synchronism. Said driving sprocket is further connected to first gear 40 is engaged with second gear 501 on the end of shaft 50, and said shaft 50 has lower gear 502 mounted on the other end and is engaged with third gear 60, so that said third gear is driven simultaneously; meanwhile, said driven sprockets are co-axially engaged with main shaft 70 respectively, and thus, transmits power to first bevel gear 701 connected at a lower end of said main shaft. Said first bevel gear is further engaged with second bevel gear 80 to drive third gear 801 mounted adjacent to said second bevel gear, and then to fourth gear 90. Such that the power output from said motor is directed transversly for horizontal motion.

Figure 3:
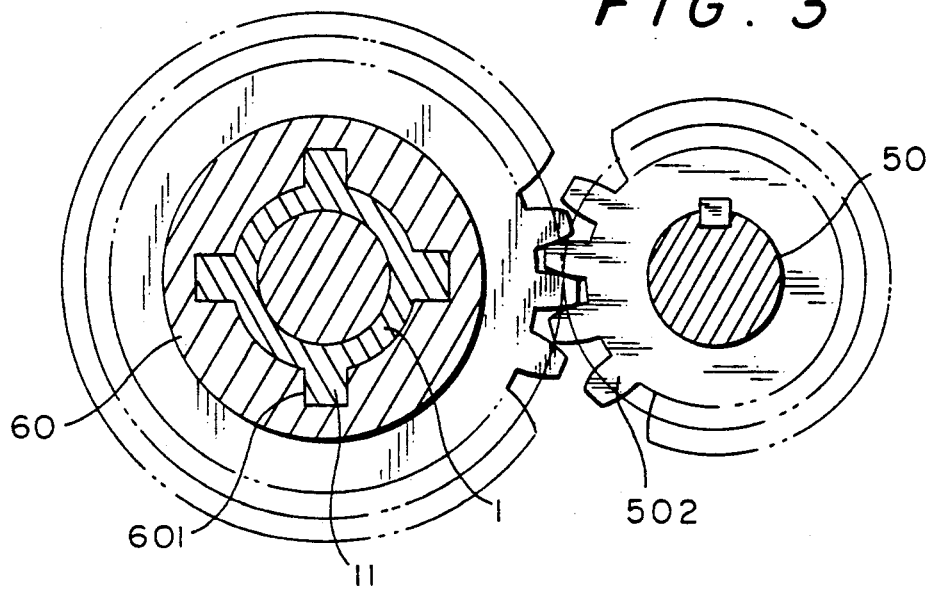
FIG. 3 is a partial view showing a vertical pushing assembly.
Figure 11:
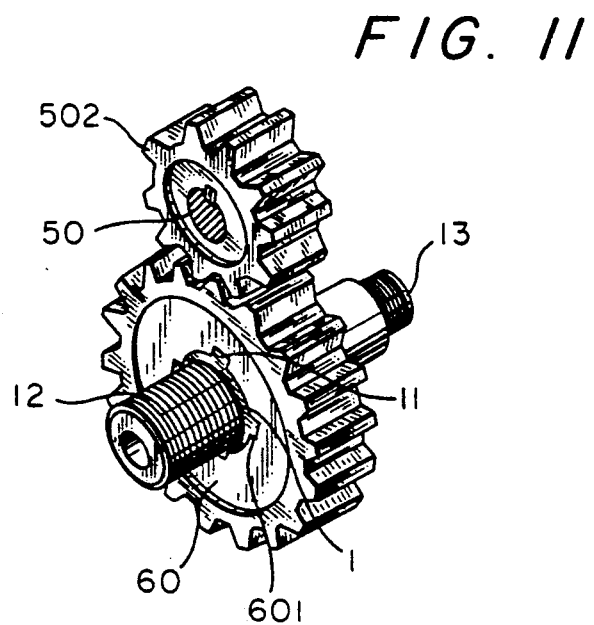
FIG. 11 is a perspective view of FIG. 3.

The vertical pushing rod assembly 200 has a plurality of rails 11 formed on the exterior surface of pushing rod 1 in the axial direction to be received by third gear 60 via a plurality of grooves 611, respectively (see FIGS. 3 and 11). Pushing rod 1 further has a threaded portion 20 at the upper end mounted with screw 2 of plate A, such that when said pushing rod is driven, plate A is to move simultaneously via said screw; and threaded portion 13 is formed at the lower end to receive molten plastic and to form the complement or female threaded portion of said plastics threaded fitting.

In the meantime, vertical shaft 300, which is disposed axially in the vertical pushing rod assembly 200, is forced to move vertically by an oil or air cylinder (not shown).

Figure 4:
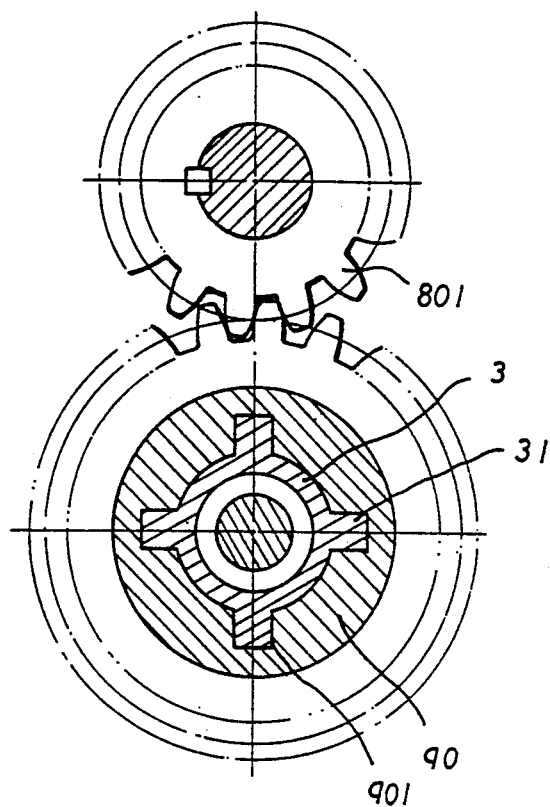
FIG. 4 is a partial view showing a horizontal pushing assembly.

The horizontal pushing assembly 400 has a pair of horizontal pushing rods 3 provided with a plurality of rails 31 inserted into fourth gear 90 via grooves 901 (see FIG. 4) such that pushing rods 3 are driven in synchronism with fourth gear 90.

While one end of the pushing rods having threaded portion 32 to produce female threads on contacting the fitting inner surface, the other end with inner threaded portion 33 is engaged with shaft 4 and outer threaded portion 34 is engaged with flange B of framework C (see FIG. 1).

Figure 5:
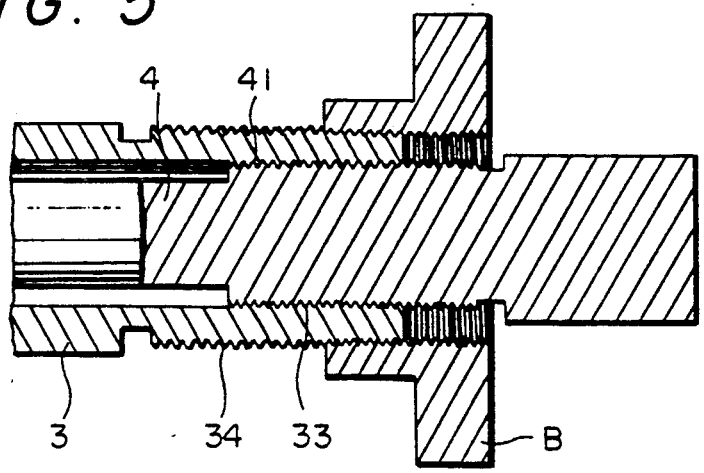
FIG. 5 is shows horizontal pushing means and shafts.
Figure 6:
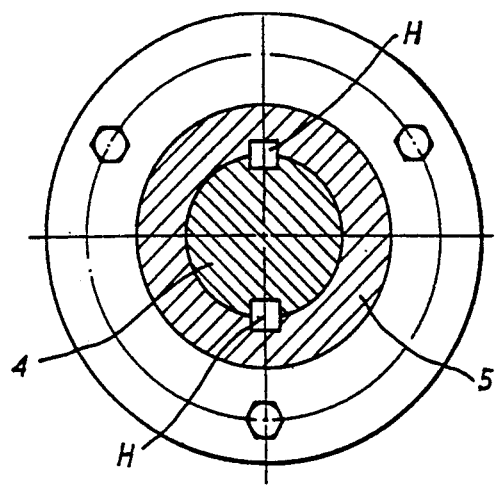
FIG. 6 is shows the connection of horizontal shafts and a flange.
Figure 7:
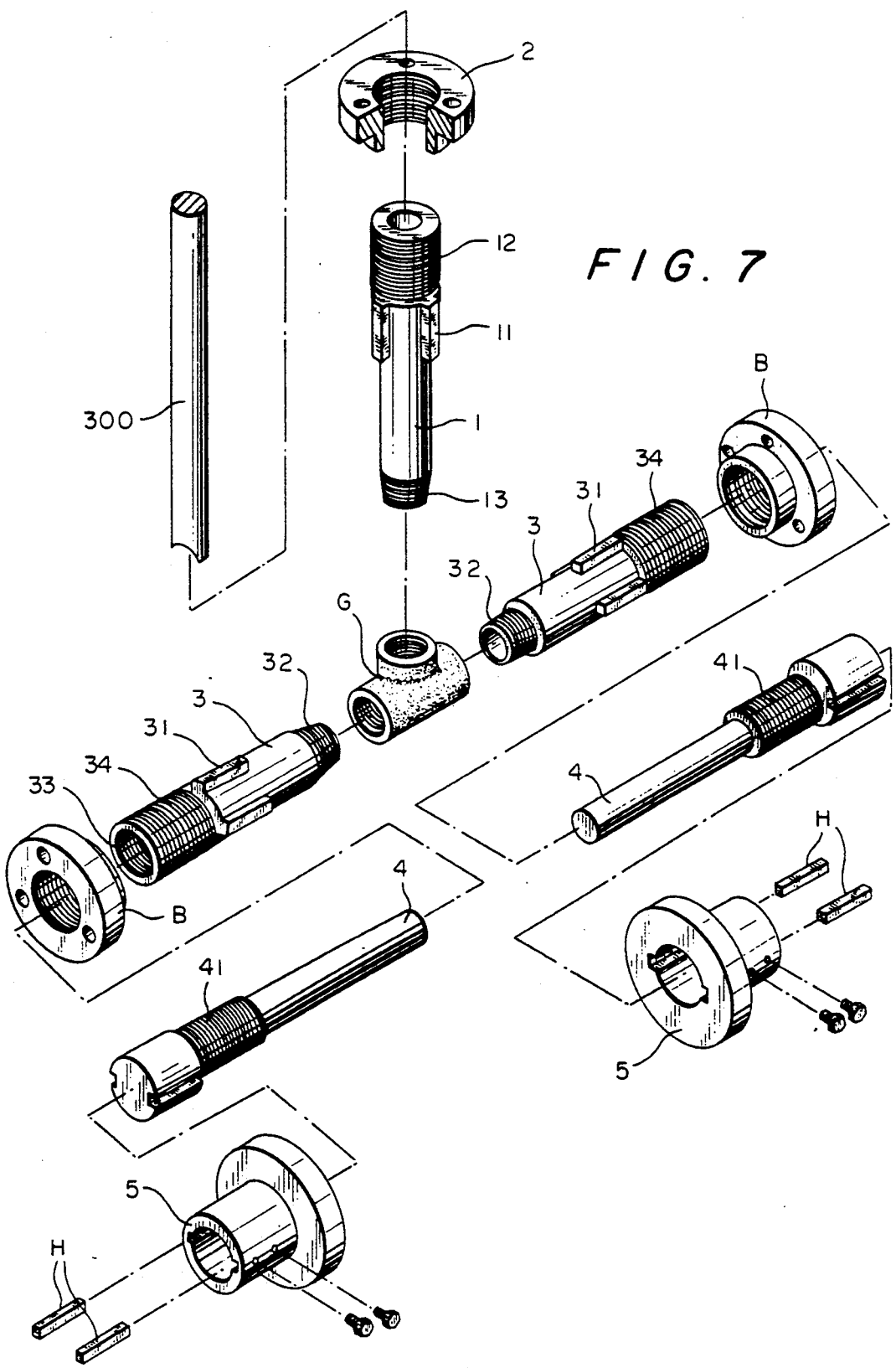
FIG. 7 is a perspective view showing a partial assembly of the invention.
Figure 8:
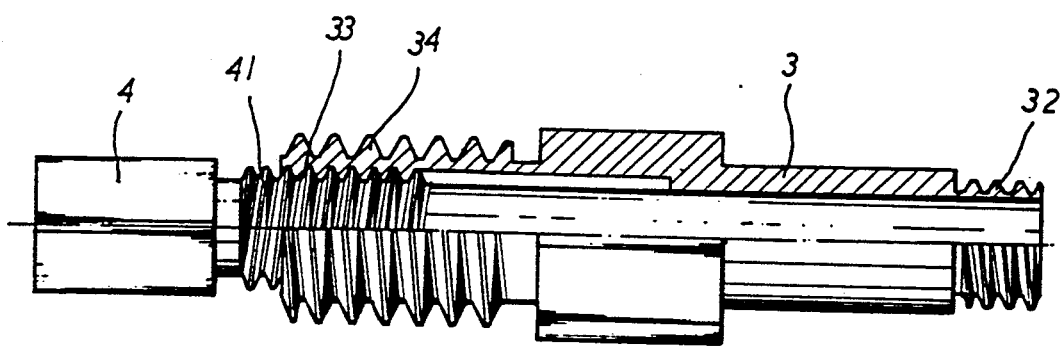
FIG. 8 is shows the assembly of horizontal pushing means and a horizontal shaft.
Figure 9:
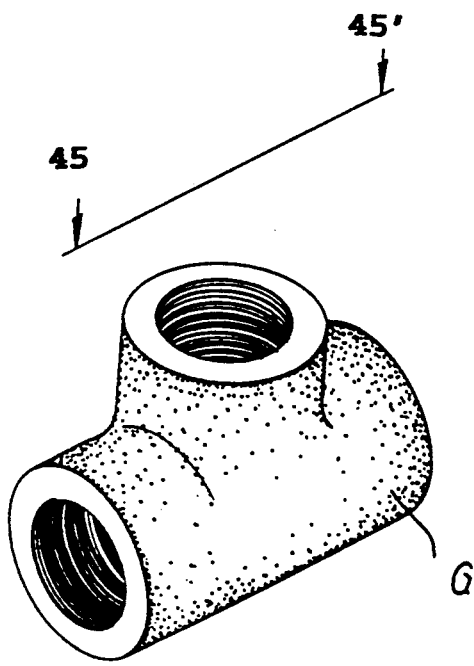
FIG. 9 is a perspective view of a three-way plastics threaded fitting.
Figure 10:
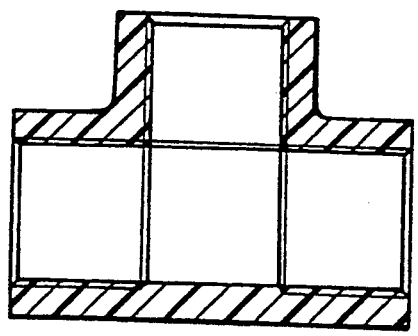
FIG. 10 is a frontal elevational view thereof.

The horizontal plunger assembly 500 has a pair of horizontal shafts 4 with threaded portions 41 facing each other, disposed co-axially in the horizontal pushing rods 3 and threadedly engaged with each other at threaded portion 41 and inner threaded portion 33 (FIGS. 5 and 6). One end of said shafts 4 is engaged with key H, and secured to flange 5 is further mounted to flange B, such that the horizontal pushing rods are driven to rotate, and force horizontal shafts 4 threadedly moving each other. Moreover, the shafts are faster than pushing rods due to the threaded arrangement, so that shafts position will be slightly over the pushing rods at the end of the stroke.

It is further pointed out that, in other to reverse the operation, the motor of transmission 100 is rotated in reverse direction to drive the sprocket rotation reversely in synchronism. Similarly, shafts 4 are moving faster, and will be slightly disposed in tHe pushing rods.

In, as in operation, vertical pushing rod 1 is moving downward, and a pair of horizontal pushing rods 3 move each other forward, while, a pair of horizontal shaft performs in the same manner, such that molten plastic can be injected from cavity 91 formed on bottom plate 9 to form a three-way plastics threaded fitting G. Reversing the operation, and taking out the fitting, the operation can be operated continuously for fast and accurate production.

Accordingly, it is possible, using the invention mechanism, to make plastics threaded fittings with exterior threaded portions in the same manner.

Figure 12:
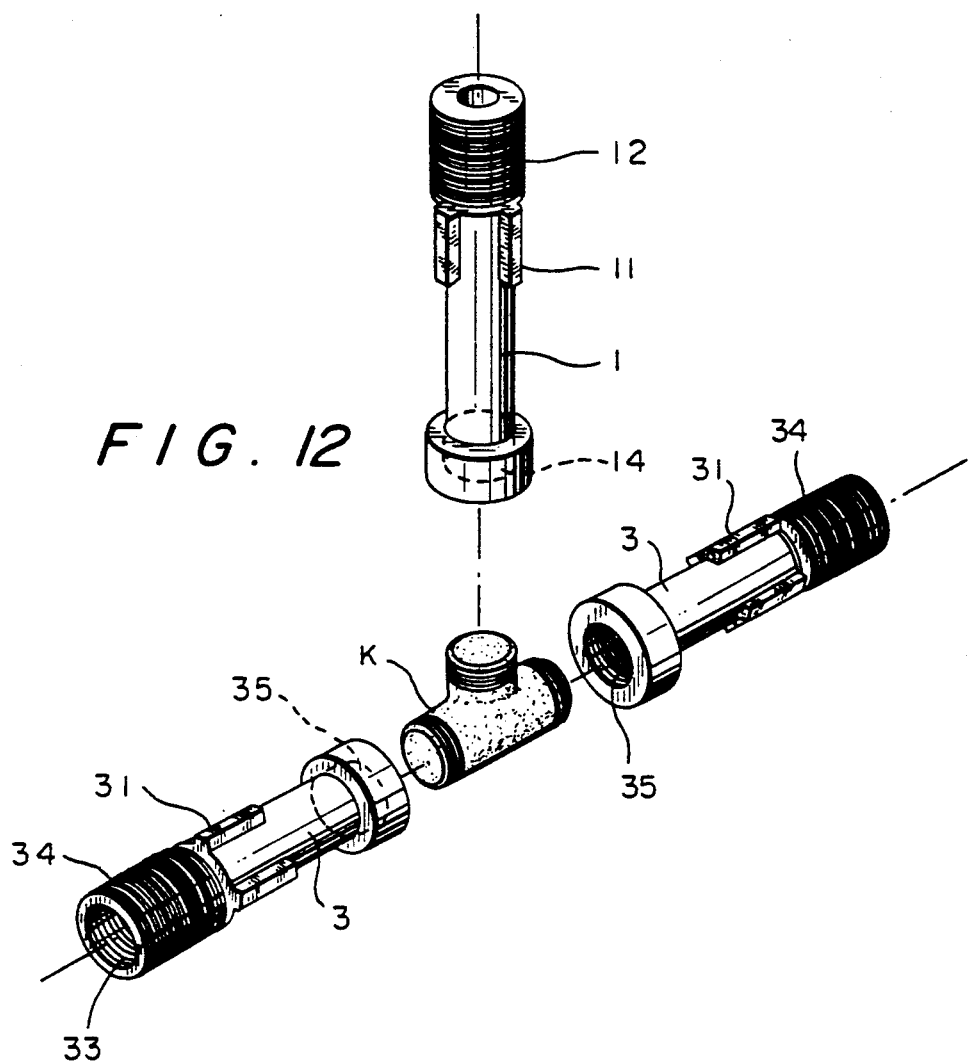
FIG. 12 is a perspective view showing an exterior three-way plastics threaded fitting accordingly to another embodiment of the invention.

Referring to FIG. 12, threaded portion 14 of an inner threaded portion is formed on the corresponding end of vertical pushing rod 1, and threaded portion 35 is formed on the horizontal pushing rods 3 to replace threaded portions 13 and 32 respectively, therefore, exterior threaded portions of the plastics threaded fitting k can be made accordingly.

And since the nature of making the fitting is to utilize the combination of pushing rods and shafts, the inner or outer diameters can be selected to fit various types of pipes.

What is claimed is:

1. In a plastics threaded fitting molding mechanism, the improvement comprising:
   a transmission, a vertical pushing assembly, a vertical shaft assembly, a horizontal shaft assembly, and a vertical pushing rod assembly; wherein,
   said transmission comprises a driving sprocket and a pair of driven sprockets driven by a motor via a chain to rotate in synchronism; said driving sprocket being further connected to a first gear engaged with a second gear on end of a shaft 50, said shaft having a lower gear 502 mounted on its other end and is engaged with third gear 60, so that said third gear is driven simultaneously;
   said vertical pushing rod assembly 200 has a plurality of rails 31 formed on an exterior surface of said pushing rod assembly in an axial direction so that it is received by said gear via a plurality of grooves;
   said vertical shaft assembly is disposed axially in said vertical pushing rod and is forced to move by oil or air cylinder;
   said horizontal pushing assembly having a pair of horizontal rods provided with a plurality of rails insertable into a fourth gear 90 via grooves defined therein, such that said pushing rods are driven in synchronism with said fourth gear, while one end of said pushing rods having a threaded portion is adapted to provide female threads on a contacted pipe joint inner surface, and the another end with outer threaded portion 34 is engaged with flange B of framework C;
   said horizontal shaft assembly is having a pair of horizontal shafts with threaded portions 41 facing each other, and disposed co-axially in said horizontal pushing rod and threadedly engaged with each other at threaded portion 41, while one end of said shafts are engaged with key H and secured to flanges,
   such that said vertical pushing rod is moveable downwardly, a pair of horizontal pushing rods are moveable forward of each other, a pair of said horizontal shafts are driveable slightly over said pushing rods and said vertical shafts so that molten plastic is injectable from a cavity formed on a bottom plate to form a three-way pipe joint.

2. A plastics threaded fitting molding mechanism of claim 1, wherein said threaded portion of said horizontal pushing rod and said threaded portion of said vertical pushing rod have inner threads that make an outer threaded plastics fitting.

* * * * *